2,967,786
METHOD OF LAMINATING

Warren K. Wilson, Akron, Ohio, assignor to The Goodyear Tire & Rubber Company, Akron, Ohio, a corporation of Ohio No Drawing. Filed Aug. 22, 1958, Ser. No. 756,540

6 Claims. (Cl. 117—49)

This invention relates to a method of applying a coating of a linear copolyester to a metal base.

High molecular weight linear copolyesters such as the linear aromatic copolyesters are stable, relatively inert materials that are tough, strong, moisture-resistant, corrosion-resistant, and resistant to the action of various chemicals. These copolyesters also have excellent electrical properties. Because of these properties, the linear aromatic copolyesters form highly desirable coatings for metals, particularly metals such as aluminum, copper, magnesium, iron, chromium and steel.

It is an object of this invention to provide a method of laminating metals with linear aromatic copolyesters. It is another object to provide a method of coating a metal with linear copolyesters in which the coating is tightly adherent to the metal base. It is another object to provide a method of laminating metals in which the degree of adhesion between the metal base and the coating can be regulated. It is still another object of the invention to provide a method of coating metals in which the coating adheres, but may be stripped from the metal.

According to this invention, metals can be coated with linear aromatic copolyesters and the degree of adhesion between the metal and the coating regulated by coating the metal with a molten copolyester while regulating the temperature of the metal which is being coated.

Thus, according to the invention, the copolyester resin does not adhere to a metal maintained at a temperature below 90° C., but bonds lightly to metal maintained at a temperature of about 100° C. The coating is strippable when the metal and the polyester are cooled. Polyester bonds to metal maintained at a temperature above 200° C. and the coating is tightly adherent and cannot be stripped from the metal even after cooling to very low temperatures.

The following example illustrates the invention:

A block of aluminum 2.5 inches long, 2.5 inches wide and ¼ inch thick having one face polished with No. 600 emery paper and equipped with a thermocouple located in the surface of the polished face, was heated to various temperatures. The polished face was pressed firmly against samples of molten linear copolyester, the copolyester being at a temperature of 280° C. Cold aluminum metal did not stick to the copolyester and showed no signs of sticking up to 90° C. At 100° C. the molten polyester adhered to the face of the block, but upon cooling to room temperature was readily peeled off. When the block was heated to 250° C. and pressed against the molten polymer, a tightly adherent coating was formed that could not be chipped off by a hammer and chisel even after the coated block had been cooled to −80° C. in a Dry Ice bath.

The linear copolyester used in the above example was a random 75/25 ethylene terephthalate-ethylene isophthalate copolyester, a copolyester in which the ethylene terephthalate units comprised 75 percent of the sum of the ethylene terephthalate and ethylene isophthalate units in the copolyester and the ethylene isophthalate units comprised 25 percent of said sum. Other linear random copolyesters can also be used, such as the random linear ethylene terephthalate-ethylene isophthalate copolyesters in which the ethylene terephthalate units comprise from 80 to 30 percent of the sum of the ethylene terephthalate units and ethylene isophthalate units in the copolyester and the ethylene isophthalate units correspondingly comprise from 20 to 70 percent of said sum and the random ethylene terephthalate 2,2 bis [4-(beta hydroxyethoxy) phenyl] propane terephthalate copolyesters in which the ethylene terephthalate units comprise from 80 to 20 percent of the sum of the ethylene terephthalate and 2,2 bis [4-(beta hydroxyethoxy) phenyl] propane terephthalate units and the 2,2 bis [4-(beta hydroxyethoxy) phenyl] propane terephthalate units correspondingly comprise from 20 to 80 percent of said sum. The invention is particularly applicable to the ethylene terephthalate-ethylene isophthalate copolyesters in which the ethylene terephthalate units comprise from 65 to 30 percent of the sum of the ethylene terephthalate units and ethylene isophthalate units and the ethylene isophthalate units correspondingly comprise from 35 to 70 percent of said sum and the random ethylene terephthalate-2,2-bis [4-(beta hydroxyethoxy) phenyl] propane terephthalate copolyesters in which the ethylene terephthalate units comprise from 65 to 30 percent of the sum of the ethylene terephthalate and 2,2-bis [4(beta hydroxyethoxy) phenyl] propane terephthalate units in the copolyester and the 2,2-bis [4(beta hydroxyethoxy) phenyl] propane terephthalate units comprise from 35 to 70 percent of said sum. The preferred copolyesters are the copolyesters containing from 60 to 40 percent of ethylene terephthalate. The 60/40 ethylene terephthalate-ethylene isophthalate and the 60/40 ethylene terephthalate-2,2-bis [4-(beta hydroxyethoxy) phenyl] propane terephthalate are the most preferred copolyesters for the present invention.

The ethylene terephthalate-ethylene isophthalate copolyesters can readily be prepared by the method disclosed in British Patent 766,290.

The ethylene terephthalate-2,2-bis [4-(beta hydroxyethoxy) phenyl] propane terephthalate copolyesters are prepared by reacting bis-beta hydroxyethyl terephthalate with 2,2-bis [4-(beta hydroxyethoxy) phenyl] propane according to the following example:

Bis-β-hydroxyethyl terephthalate is prepared by charging a molten mixture of 6800 grams of dimethyl terephthalate and 5000 grams of premium grade ethylene glycol 15% excess) into a 12 liter flask equipped with a heating mantle, fractionating column, nitrogen inlet tube and stirrer. Ester interchange catalysts (0.03% zinc acetate and 0.0051% manganese acetate, based on the weight of dimethyl terephthalate) are added at a temperature of 140° C. The temperature is slowly raised, and a slow stream of nitrogen is bubbled through the melt to help sweep out the methanol evolved. The column is cooled with compressed air and conditions are adjusted so that the temperature at the top of the column remains below 70° C. As methanol is evolved, the temperature of the pot slowly rises until it reaches 200° C., at which point the heat input is reduced to hold the temperature constant. The reaction is essentially complete after the pot temperature has been held at 200° C. for about 45 minutes.

2,459 grams of the bis-glycol terephthalate and 1,141 grams of 2,2-bis [4-(β-hydroxyethoxy) phenyl] propane are used. The reactor is evacuated and filled, i.e., brought back to atmospheric pressure, with "lamp grade" nitrogen. The molten mixture is then charged through a long conical funnel fitted with a fine mesh stainless steel screen into a round-bottomed cylindrical reactor about 10 inches high and having an inside diameter of about 6 inches, equipped with a close clearance wall scraping type of stirrer or agitator. A polymerization catalyst, ethylene glycol titanate (prepared by adding 10 parts of ethylene glycol to 20 parts of tetraisopropyl titanate dissolved in 50 parts of benzene and allowing the mixture to stand at room temperature for 24 hours. The precipitate formed, ethylene glycol titanate, was filtered off and dried. Further details of preparing such catalysts can be found in copending application, Serial No. 596,419, filed July 9, 1956, by A. Piirma) in the amount of 0.0022% by weight, based on the combined weight of the glycol terephthalate and the 2,2-bis [4-β-hydroxyethoxy)phenyl] propane, is placed in the charging funnel beneath the screen so that it will be carried into the reactor by the molten charge. Agitator speed is set at about 100 r.p.m. and heat is supplied and the pressure is slowly reduced. Minimum pressure (about 0.5 millimeter of mercury) and maximum temperature (275–280° C.) are reached in approximately 1.5 hours. As the viscosity of the mixture increases, the agitation speed is reduced until a speed of about 46 r.p.m. is obtained. The polymer is discharged from the reactor when it reaches an intrinsic viscosity of about 0.65 to 0.70.

The above example shows the preparation of a 60/40 ethylene terephthalate - 2,2 - bis [4 - (β - hydroxyethoxy) phenyl] propane terephthalate copolyester by reacting 2549 grams of glycol terephthalate with 1141 grams of 2,2-bis [4-(β-hydroxyethoxy) phenyl] propane. Specific copolyesters having various ratios of ethylene terephthalate and 2,2-bis [4-(β-hydroxyethoxy) phenyl] propane terephthalate are prepared by adjusting the proportions of the two materials used.

The example has illustrated the invention with particular respect to coating metallic aluminum. Other metals can also be coated. Representative examples of such metals are magnesium, copper, iron, chromium, silver and steel.

Metals can be coated by contacting molten polyester at a temperature of from about 150 to 300° C. with metal maintained at a temperature of from 95 to 300° C. At a metal temperature of from 100 to 200° C. the coating is adherent, but strippable when the metal and the coating are cooled to room temperature. At a metal temperature of from 200 to 300° C. the coating is tightly adherent and when the composite article is cooled to room temperature it cannot be stripped from the metal. Thus, the coatings obtained in this temperature range are tightly adherent, contiguous coatings that remain tightly adherent even though the metal is cooled to very low temperatures.

The temperature at which the molten copolyester is used will be adjusted according to the melting point and viscosity of the particular copolyester and the thickness of the coating it is desired to apply. With higher melting copolyesters and copolyesters of higher viscosity, temperatures on the high end of the range will be used. For example, with an 80/20 ethylene terephthalate-ethylene isophthalate copolyester, a temperature of about 220° C. can be used. Generally, however, a temperature of about 240 to 260° C. will be used so that the viscosity of the copolyester will be low enough that a thin coating of the copolyester can be made. For a 60/40 copolyester a temperature of about 150° C. can be used, but the copolyester at this temperature is very viscous and generally the temperature used will be in the range of from 220 to 260° C.

Copolyesters of this invention in which the ethylene terephthalate units comprise from 80 to 65 percent of the ester units in the copolyester are crystallizable. In order that they be free from haziness or cloudiness they should be amorphous and should not crystallize. As the proportion of ethylene terephthalate increases, the rate of crystallization and the total amount of crystallization obtainable increase. If haze-free laminates of these copolyesters are desired it is necessary to cool them below their minimum crystallization temperature before they crystallize appreciably. Copolyesters of this invention in which the ethylene terephthalate units comprise from 65 to 20 percent of the ester units in the copolyester are substantially noncrystallizable and remain completely or substantially amorphous. It is generally unnecessary to cool laminates of these copolyesters to obtain haze free laminates.

The coatings or laminations made from the amorphous noncrystallizable resins are also amorphous and have all of the advantages of the amorphous properties of the resins. The coatings are clear, transparent, tough, noncrystalline, nonheat shrinkable and are resistant to abrasion and heat. Since they cannot be crystallized they do not develop spots of crystallites if exposed to heat.

The invention has been illustrated in respect to applying one coating of the polyester to a metal base. When the metal is in the form of a sheet, the polyester can be applied to each side of the sheet or two or more sheets of metal can be laminated together by placing the molten polyester between the sheets and pressing them together. Thus, several lamina can be built up. The invention, therefore, encompasses the making of laminated articles of several lamina as well as the making of metal articles in which only one piece or sheet of metal is laminated. The laminae can be built up in separate laminating steps or can be made by simultaneously laminating the several lamina.

In the case of wire and other forms of metal in continuous lengths, the coating can be applied by continuously running the hot metal through molten polyester.

The metal to be laminated should be clean and free from oil, grease, dust or dirt. The metal surface can be smooth and polished or rough. It is preferred that the surface be slightly rough where tightly adherent coatings are desired because the resin-metal bond is somewhat stronger where the metal surface is rough.

While certain representative embodiments and details have been shown for the purpose of illustrating the invention, it will be apparent to those skilled in the art that various changes and modifications may be made therein without departing from the spirit or scope of the invention.

I claim:

1. The method of coating a metal base with a linear copolyester selected from the group consisting of (a) random ethylene terephthalate-ethylene isophthalate copolyesters in which the ethylene terephthalate units comprise from 80 to 30 percent of the sum of the ethylene terephthalate and ethylene isophthalate units in the copolyester and the ethylene isophthalate units comprise from 20 to 70 percent of said sum and (b) random ethylene terephthalate-2-2-bis[4(beta hydroxyethoxy) phenyl] propane terephthalate copolyesters in which the ethylene terephthalate units comprise from 80 to 20 percent of the sum of the ethylene terephthalate and 2,2-bis[4-(beta hydroxyethoxy) phenyl] propane terephthalate units and the 2,2-bis [4(beta hydroxyethoxy) phenyl] propane terephthalate units comprise from 20 to 80 percent of said sum which comprises heating the metal and maintaining it at a temperature of from 100 to 300° C., contacting it with molten polyester resin maintained at a temperature from 150 to 300° C. and cooling the composite article.

2. The method of coating metal with a strippable coating of a linear copolyester selected from the group consisting of (a) random ethylene terephthalate-ethylene isophthalate copolyesters in which the ethylene terephthalate units comprise from 80 to 30 percent of the sum of the ethylene terephthalate and ethylene isophthalate units in the copolyester and the ethylene isophthalate units comprise from 20 to 70 percent of said sum and (b)

random ethylene terephthalate-2,2-bis [4-(beta hydroxyethoxy) phenyl] propane terephthalate copolyesters in which the ethylene terephthalate units comprise from 80 to 20 percent of the sum of the ethylene terephthalate and 2,2-bis [4-(beta hydroxyethoxy) phenyl] propane terephthalate units and the 2,2-bis [4-(beta hydroxyethoxy) phenyl] propane terephthalate units comprise from 20 to 80 percent of said sum which comprises heating the metal and maintaining it at a temperature from 100 to 200° C., coating it with a molten linear polyester resin, said resin being maintained at a temperature of from 150 to 300° C. while being coated on the metal and cooling the thus-coated article.

3. The method of coating metal with a tightly adherent contiguous coating of a linear copolyester selected from the group consisting of (a) random ethylene terephthalate-ethylene isophthalate copolyesters in which the ethylene terephthalate units comprise from 80 to 30 percent of the sum of the ethylene terephthalate and ethylene isophthalate units in the copolyester and the ethylene isophthalate units comprise from 20 to 70 percent of said sum and (b) random ethylene terephthalate-2,2-bis [4-beta hydroxyethoxy) phenyl] propane terephthalate copolyesters in which the ethylene terephthalate units comprise from 80 to 20 percent of the sum of the ethylene terephthalate and 2,2-bis [4-(beta hydroxyethoxy) phenyl] propane terephthalate units and the 2,2-bis [4-(beta hydroxyethoxy) phenyl] propane terephthalate units comprise from 20 to 80 percent of said sum which comprises heating the metal and maintaining it at a temperature from 200 to 300° C., coating it with a molten linear polyester resin, said resin being maintained at a temperature of from 150 to 300° C. while being coated on the metal and cooling the thus-coated article.

4. The method of producing a tightly adherent, contiguous, continuous coating on a metal base which comprises heating the metal to a temperature of from 200 to 300° C. and coating it with a molten ethylene terephthalate-ethylene isophthalate copolyester resin in which the ethylene terephthalate units comprise from 80 to 30 percent of the sum of the ethylene terephthalate and ethylene isophthalate units correspondingly comprise from 20 to 70 percent of said sum, said resin being maintained at a temperature of from 150 to 300° C., while being coated on a metal and cooling the composite article.

5. The method of laminating a metal base with a random ethylene terephthalate-ethylene isophthalate copolyester resin in which the ethylene terephtalate units comprise 60 percent of the sum of the ethylene terephthalate and ethylene isophthalate units in the copolyester and the ethylene isophthalate units comprise 40 percent of said sum which comprises maintaining the metal at a temperature of from 200 to 300° C., contacting it with the copolyester in molten state at a temperature of from 220 to 260° C. and cooling the composite article.

6. The method of laminating a metal base with a random ethylene terephthalate-2,2-bis [4-(beta hydroxyethoxy) phenyl] propane terephthalate copolyester resin in which the ethylene terephthalate units comprise 60 percent of the sum of the ethylene terephthalate and 2,2-bis [4-(beta hydroxyethoxy) phenyl] propane terephthalate units in the copolyester and the 2,2-bis [4-(beta hydroxyethoxy) phenyl] propane terephthalate units comprise 40 percent of said sum which comprises maintaining the metal at a temperature of from 200 to 300° C., contacting it with the copolyester in molten state at a temperature of from 240 to 260° C. and cooling the composite article.

References Cited in the file of this patent

UNITED STATES PATENTS

| | | |
|---|---|---|
| 2,340,109 | D'Alelio | Jan. 25, 1944 |
| 2,661,307 | Foster | Dec. 1, 1953 |
| 2,662,069 | Kass | Dec. 8, 1953 |
| 2,662,070 | Kass | Dec. 8, 1953 |
| 2,765,251 | Williams | Oct. 2, 1956 |
| 2,784,456 | Grabenstein | Mar. 12, 1957 |
| 2,865,891 | Michel | Dec. 23, 1958 |